(12) United States Patent
Korremla et al.

(10) Patent No.: US 11,335,180 B1
(45) Date of Patent: May 17, 2022

(54) APPARATUS AND SYSTEMS FOR FLOOD/MOISTURE DETECTION AND NOTIFICATION

(71) Applicant: Duke Energy Corporation, Charlotte, NC (US)

(72) Inventors: Shiva K Sainoju Korremla, Cary, NC (US); Steven P. Hinkel, California, KY (US); Jason L. Plummer, Mocksville, NC (US); Christian Petit Guenther, Atlanta, GA (US); Jason P. Handley, Waxhaw, NC (US)

(73) Assignee: Duke Energy Corporation, Charlotte, NC (US)

( * ) Notice: Subject to any disclaimer, the term of this patent is extended or adjusted under 35 U.S.C. 154(b) by 0 days.

(21) Appl. No.: 17/182,665

(22) Filed: Feb. 23, 2021

(51) Int. Cl.
  *G08B 1/08* (2006.01)
  *G08B 21/20* (2006.01)
  *H04N 7/18* (2006.01)
  *G08C 17/02* (2006.01)

(52) U.S. Cl.
  CPC ............ *G08B 21/20* (2013.01); *G08C 17/02* (2013.01); *H04N 7/183* (2013.01)

(58) Field of Classification Search
  CPC ......... G08B 21/20; G08C 17/02; H04N 7/183
  USPC .................................................... 340/539.26
  See application file for complete search history.

(56) References Cited

U.S. PATENT DOCUMENTS

| 4,153,881 | A | * | 5/1979 | Permut | G08B 27/00 73/304 R |
|---|---|---|---|---|---|
| 5,283,569 | A | * | 2/1994 | Nelson | H04M 11/04 379/106.01 |
| 5,357,247 | A | * | 10/1994 | Marnel | H04M 11/002 379/70 |
| 7,681,436 | B2 | * | 3/2010 | Biberger | G01N 33/18 73/61.41 |
| 8,710,994 | B2 | * | 4/2014 | Chan | G08B 21/20 340/618 |
| 2001/0004240 | A1 | * | 6/2001 | Freill | G08B 21/20 340/625 |
| 2012/0126990 | A1 | * | 5/2012 | Chan | G08B 21/20 700/275 |
| 2014/0343736 | A1 | * | 11/2014 | Meyer | G05D 7/0635 700/283 |
| 2017/0098362 | A1 | * | 4/2017 | Walbert | G08B 21/182 |
| 2017/0294099 | A1 | * | 10/2017 | Sequeira | G08B 21/10 |
| 2018/0089981 | A1 | * | 3/2018 | Walbert | G08B 21/20 |
| 2019/0027013 | A1 | * | 1/2019 | Sale | G08B 21/20 |
| 2020/0064448 | A1 | * | 2/2020 | Dubey | G01S 7/4813 |
| 2020/0392954 | A1 | * | 12/2020 | Mou | F04B 49/06 |

FOREIGN PATENT DOCUMENTS

CN 102486649 A * 6/2012

* cited by examiner

*Primary Examiner* — Zhen Y Wu
(74) *Attorney, Agent, or Firm* — Myers Bigel, P.A.

(57) ABSTRACT

A monitoring apparatus includes a rigid structure, at least one sensor supported by the structure that is configured to detect a level of liquid or a presence of moisture in a vicinity of the structure, and a housing supported by the structure. A transmitter and a controller are located within the housing. The controller is in electrical communication with the at least one sensor and the wireless transmitter, and the controller is configured to cause the transmitter to transmit measurement data received from the at least one sensor to a remote device.

22 Claims, 4 Drawing Sheets

APPARATUS AND SYSTEMS FOR FLOOD/MOISTURE DETECTION AND NOTIFICATION

FIELD OF THE INVENTION

The present invention relates generally to sensors and, more particularly, to environmental sensors.

BACKGROUND OF THE INVENTION

Electric utility assets, such as substations, are often located in areas that are less desirable for other uses. These areas may be low-lying areas adjacent to rivers and streams and which may be subjected to flooding. For example, flooding at a substation may damage high voltage equipment and may require de-energization of the entire substation. Because substations are generally unattended, electric utilities typically send personnel out to monitor for flooding during storms. Unfortunately, this practice may be expensive and may subject personnel to dangerous conditions.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a monitoring apparatus includes a rigid structure, at least one sensor supported by the structure that is configured to detect a level of liquid or a presence of moisture in a vicinity of the structure, and a housing supported by the structure. Exemplary sensors may include float sensors, ultrasonic sensors, radar sensors, lidar sensors, moisture sensors, etc. A transmitter (wired or wireless) and a controller are located within the housing. The controller is in electrical communication with the at least one sensor and the transmitter, and the controller is configured to cause the transmitter to transmit data received from the at least one sensor to a remote device. The controller may also be configured to generate an alert or notification that is transmitted to personnel and/or to equipment. For example, in some embodiments, the alert could trigger not only human intervention but also command various equipment to perform a function. For example, equipment such as pumps, valves, motors, etc., may be commanded to turn on and/or off, change current operational status, etc. A door may be commanded to close and/or open. Various electrical equipment may be commanded to de-energize and/or re-energize, etc.

In some embodiments, the rigid structure is configured to be mounted on or in the ground, such as a pipe or post. In other embodiments, the structure is configured to be mounted to another structure.

In some embodiments, the at least one sensor includes a first sensor and a second sensor in vertically spaced apart relationship on the structure. For example, in some embodiments, the first sensor is supported by the structure so as to be located at least approximately six inches (6") above the ground, and the second sensor is supported by the structure so as to be located at least approximately eighteen inches (18") above the ground. The first or lower sensor can identify the beginning of a flood situation in the vicinity and an early warning can be issued. The second or upper sensor can identify when flood water has reached a hazardous level. In addition, the use of two sensors in vertical, spaced-apart relationship allows for the calculation of the rate of rise of flood water, as well as the rate that flood water is receding.

In some embodiments, the monitoring apparatus includes a power source that is configured to supply power to the at least one sensor, the controller, and the transmitter. Exemplary power sources may include a battery, a solar power source and rechargeable battery for storing excess solar energy, and an energy harvesting circuit comprising graphene or station AC service. In other embodiments, the at least one sensor, the controller, and the transmitter are configured to receive electrical power from an external AC or DC power source.

In some embodiments, the monitoring apparatus further includes an image sensor (e.g., visual or infrared) configured to capture image data from a vicinity of the structure. The controller is in electrical communication with the image sensor and is configured to cause the transmitter to transmit image data received from the image sensor to the remote device.

In some embodiments, the monitoring apparatus may include additional sensors, such as a liquid flow sensor, a moisture sensor, an anemometer, a temperature sensor, a humidity sensor, a noise sensor, an air quality sensor, etc.

According to other embodiments of the present invention, a monitoring apparatus includes a rigid structure configured to be mounted on or in the ground, a first sensor and a second sensor supported by the structure in vertically spaced apart relationship, and a housing supported by the structure. The first and second sensors are configured to measure a level of liquid in a vicinity of the structure. A transmitter (wired or wireless) and a controller are located within the housing. The controller is in electrical communication with the first and second sensors and the transmitter, and the controller is configured to cause the transmitter to transmit measurement data received from the first and second sensors to a remote device. In addition, the controller is configured to determine a rate of rise of liquid near the structure and to cause the transmitter to transmit the rate of rise data to the remote device. The controller may also be configured to determine a rate at which liquid is receding (e.g., receding flood water) near the structure and to cause the transmitter to transmit the receding rate to the remote device. The monitoring apparatus also includes a power source configured to supply power to the first and second sensors, the controller, and the transmitter.

According to other embodiments of the present invention, a monitoring system includes a monitoring apparatus, comprising at least one wireless sensor and at least one wireless node in a vicinity of the at least one wireless sensor that receives data from the at least one wireless sensor. For example, the at least one wireless sensor may be configured to measure a level of liquid in a vicinity of the monitoring apparatus and transmit liquid level data to the at least one wireless node. The at least one wireless node is configured to receive the liquid level data from the at least one wireless sensor and to transmit the liquid level data to a remote device. Exemplary wireless sensors include float sensors, ultrasonic sensors, radar sensors, lidar sensors, etc. The at least one wireless node may also be configured to transmit a command to equipment in a vicinity of the monitoring apparatus to perform a function. For example, equipment such as pumps, valves, motors, etc., may be commanded to turn on and/or off, change current operational status, etc. A door may be commanded to close and/or open. Various electrical equipment may be commanded to de-energize and/or re-energize, etc.

Embodiments of the present invention are advantageous because time and cost associated with monitoring substations and other electric utility assets can be reduced, while also increasing customer reliability. Monitoring apparatus and systems according to embodiments of the present invention allow for rerouting of power flow for extreme high voltage assets, such as transmission substations, when flood conditions exist. Moreover, because remote monitoring is possible, personnel safety is increased. In addition, monitoring apparatus and systems according to embodiments of the present invention can alert authorized personnel when flood waters have receded to a safe level to restore power to equipment. Monitoring apparatus and systems according to embodiments of the present invention can also be configured to restore power to equipment automatically and without the requirement of human intervention.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

DETAILED DESCRIPTION

Figure 1:
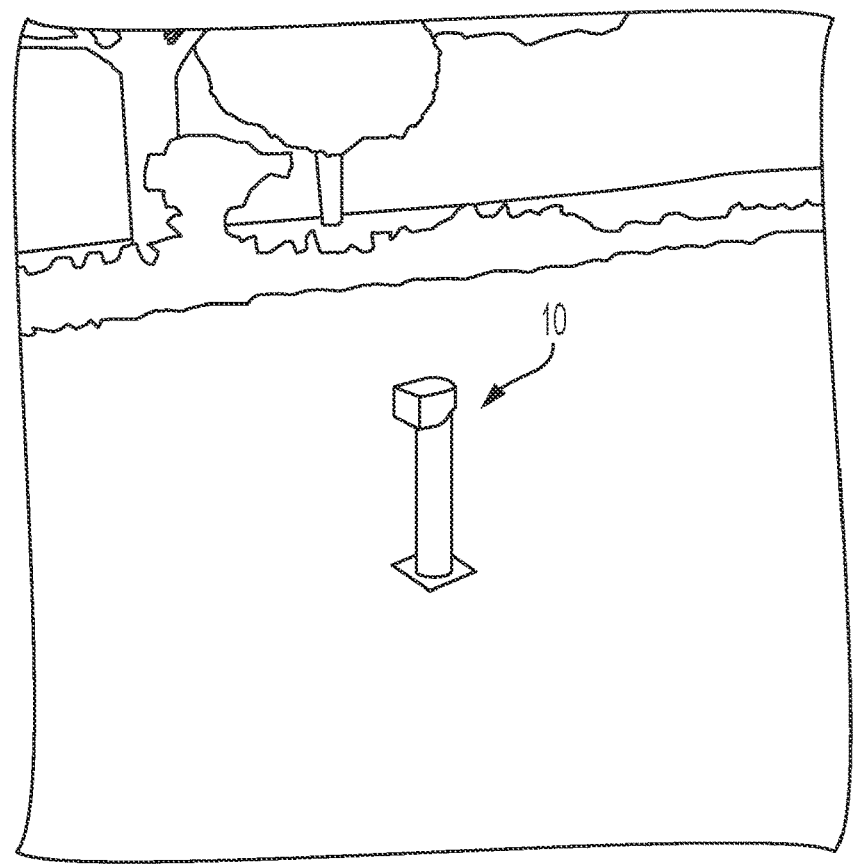
FIG. 1 illustrates a monitoring apparatus according to some embodiments of the present invention in an installed configuration.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines illustrate optional features or operations unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.," which derives from the Latin phrase "exempli gratia," may be used to introduce or specify a general example or examples of a previously mentioned item, and is not intended to be limiting of such item. The common abbreviation "i.e.," which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

The terms "about" and "approximately", as used herein with respect to a value or number, means that the value or number can vary by +/−twenty percent (20%).

Figure 2:
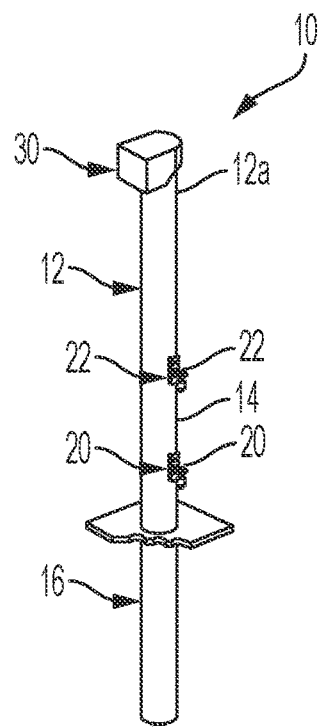
FIG. 2 is a perspective view of a monitoring apparatus according to some embodiments of the present invention.

Referring to FIGS. 1 and 2, a monitoring apparatus 10 according to some embodiments of the present invention is illustrated. The monitoring apparatus 10 includes a rigid structure 12, such as a post or pipe, that is configured to be mounted in the ground (FIG. 1). The illustrated structure 12 includes an above-ground portion 14 and a below-ground portion 16, as illustrated in FIG. 2. The below ground portion 16 of the structure 12 is configured to be embedded, for example, within concrete in order to withstand strong water currents. In some embodiments, the structure 12 may be a pipe, such as a polyvinyl chloride (PVC) pipe. However, embodiments of the present invention are not limited to the structure 12 being a PVC pipe. Structures of various configurations and of various materials may be utilized including other polymeric materials. Typically, any material that is resistant to corrosion and degradation from the elements may be utilized.

An exemplary pipe that can serve as the structure 12 for the monitoring apparatus 10 may be a four inch (4") diameter, schedule 80 PVC pipe with a lower portion 16 approximately one to three feet (1'-3') in length and an upper portion 14 approximately two to four feet (2'-4') in length. However, various sizes and lengths of pipe may be utilized. Embodiments of the present invention are not limited to any particular length of the structure 12. Structures of various lengths as well as configurations may be utilized.

Embodiments of the present invention are not limited to having a structure 12 embedded within concrete. In some embodiments, the structure 12 may be embedded directly within the ground without the use of concrete as long as the structure remains resistant to movement caused by strong water currents. In other embodiments, a rigid structure may be configured to be attached to another structure, such as a power pole, tower, or other structure that would be resistant to strong water currents.

The illustrated monitoring apparatus 10 includes a first sensor 20 and a second sensor 22 secured in vertically spaced apart relationship to the above-ground portion 14 of the structure 12. The first and second sensors 20, 22 are configured to detect and measure a water (or other liquid) level in a vicinity of the structure 12. In addition to being used to detect flooding, a monitoring apparatus 10 according to embodiments of the present invention may be used to detect the presence of other liquids, such as oil (e.g., oil spills). For example, a monitoring apparatus 10 may be used in an oil stop valve (OSV) vault to detect oil leaks within the vault for environmental compliance.

Figure 3:
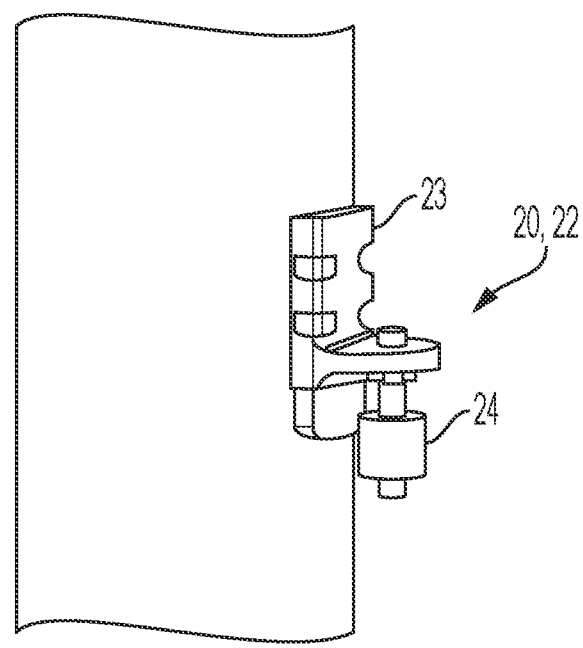
FIG. 3 is an enlarged view of one of the sensors of the monitoring apparatus of FIG. 2.
Figure 4:
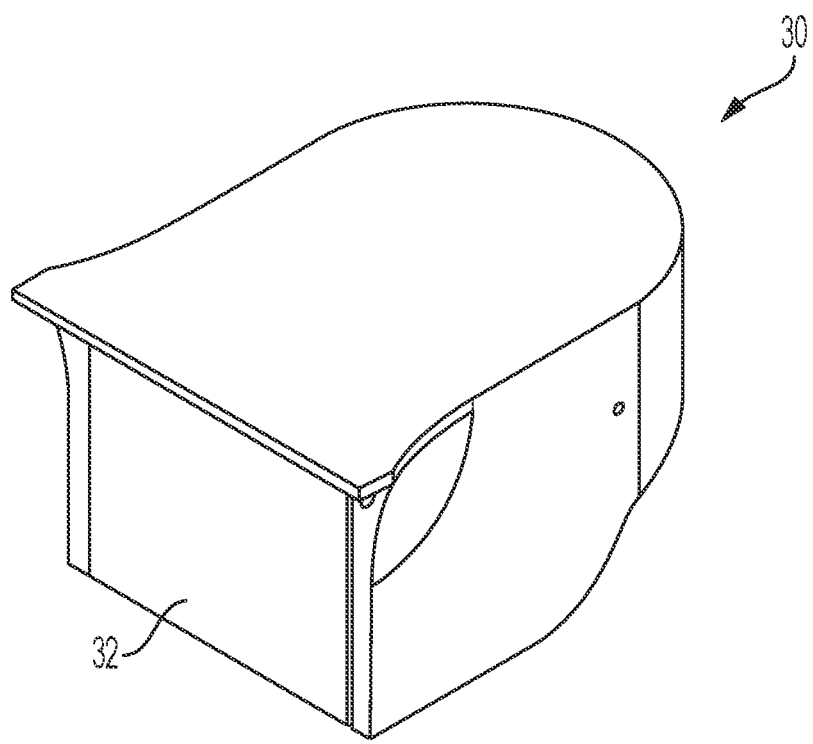
FIG. 4 is an enlarged view of the housing of the monitoring apparatus of FIG. 2.

Exemplary sensors for the first and second sensors 20, 22 include, but are not limited to, float sensors, ultrasonic sensors radar sensors lidar sensors, etc. In the illustrated embodiment, the first and second sensors 20, 22 are mechanical float sensors. For example, referring to FIG. 3, each illustrated sensor 20, 22 includes a bracket 23 that is secured to the structure 12 and a float 24 movably supported by the bracket 23. The float 24 is configured to float on top of a liquid surface and, as the liquid level goes up or down, the float moves vertically with the liquid level. The float opens or closes a switch as it moves upwardly with a rising liquid level, and the switch provides a signal to the controller 42 (FIG. 7) indicating an identified liquid level at the monitoring apparatus location.

In some embodiments, the first sensor 20 is supported by the structure 12 so as to be located approximately four to six inches (4"-6") above the ground, and the second sensor 22 is supported by the structure 12 so as to be located approximately twelve to eighteen inches (12"-18") above the ground. However, embodiments of the present invention are not limited to these dimensions. The sensors 20, 22 may each be located at various other elevations above ground level.

The use of two sensors 20, 22 is advantageous because the first or lower sensor 20 can identify the beginning of a flood event in the vicinity of the monitoring apparatus 10, and an early warning can be issued. The second or upper sensor 22 can identify when a flood level has reached a dangerous level. For example, when the monitoring apparatus 10 is used in a substation location, the second or upper sensor 22 can identify when a water level has become an imminent threat to energized equipment. In addition, the use of two sensors 20, 22 allows for additional functionality such as calculating the rate of rise of flood water (or other liquid), as well as the rate that flood water (or other liquid) is receding.

Figure 5:
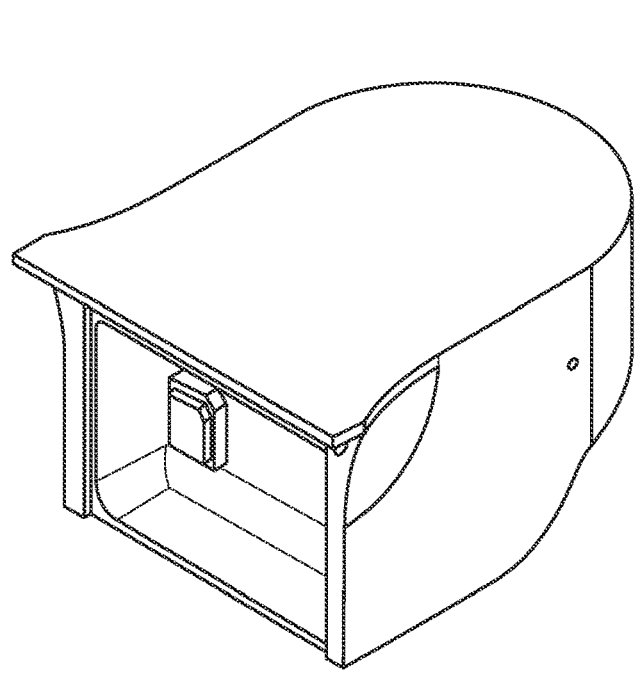
FIG. 5 illustrates the housing of FIG. 4 with a panel removed to illustrate an internal portion of the housing.

The illustrated monitoring apparatus 10 also includes a housing 30 supported by the structure 12. Although illustrated at the upper end 12a of the structure 12, the housing 30 may be secured to other portions of the post 12, as well. Embodiments of the present invention are not limited to the illustrated location or configuration of the housing 30. Located within the housing 30 are various electronic components of the monitoring apparatus 10. For example, FIG. 5 illustrates the housing 30 with a panel 32 removed to illustrate one of the electronic components inside. The housing 30 is configured to protect the electronic components therewithin from the environment and is preferably sealed to keep moisture out.

Figure 7:
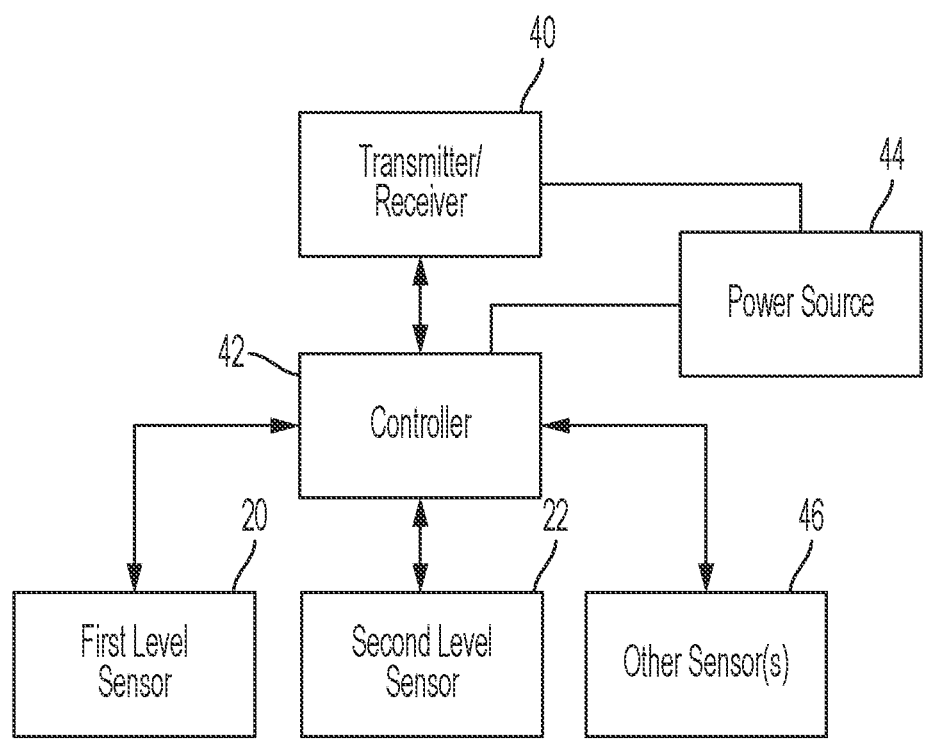
FIG. 7 is a schematic illustration of the sensors and electronic components of the monitoring apparatus of FIG. 2, according to some embodiments of the present invention.

In some embodiments, located within the housing 30 are a transmitter 40 (e.g., a wireless or wired transmitter) and controller 42, as illustrated in FIG. 7. The controller 42 is in electrical communication with the first and second sensors 20, 22 and the transmitter 40. The controller 42 is configured to cause the transmitter 40 to transmit measurement data received from the first and second sensors 20, 22 to a remote device, such as a remote computer or smart phone. For example, upon the first sensor 20 detecting a rise in water level, the first sensor 20 provides a signal to the controller 42 and the controller 42 causes the transmitter 40 to transmit water level information to a remote device, such as a smart phone, a computer in an operations center of an electric utility, etc. Exemplary transmission formats include, but are not limited to, email, text messaging, MQTT (Message Queuing Telemetry Transport), etc. Similarly, upon the second sensor 22 detecting a rise in water level, the second sensor 22 provides a signal to the controller 42 and the controller 42 causes the transmitter 40 to transmit water level information to the remote device.

In addition, the controller 42 may be configured to generate and transmit, via the transmitter 40, various alerts or notifications. Such alerts/notifications may trigger not only human intervention but may also command various types of equipment in a vicinity of the monitoring apparatus to perform one or more functions. For example, equipment (e.g., pumps, valves, etc.) may be commanded to turn on and/or off, change operational status, etc. A door may be commanded to close and/or open. Various electrical equipment may be commanded to de-energize and/or re-energize, etc.

The electronics of the monitoring apparatus 10 are powered by a power source 44 (FIG. 7). Exemplary power sources may include a battery, a solar power source and rechargeable battery for storing excess solar energy, and an energy harvesting circuit comprising a perpetually oscillating source, such as graphene. In other embodiments, the power source may be an external power source, such as an external AC or DC power source.

In some embodiments, the monitoring apparatus 10 may include one or more additional sensors 46 (FIG. 7). The controller 42 is in electrical communication with the additional sensor(s) 46 and is configured to cause the transmitter 40 to transmit data received from the additional sensor(s) 46 to a remote device. For example, in some embodiments, the monitoring apparatus 10 may include a liquid flow sensor or a moisture sensor. An exemplary location for a monitoring apparatus 10 with a moisture sensor is a relay cabinet, a cable tray, etc. In other embodiments, the monitoring apparatus 10 may include an image sensor that is configured to capture image data of a vicinity of the monitoring apparatus 10. The controller 42 is in electrical communication with the image sensor and is configured to cause the transmitter 40 to transmit image data received from the image sensor to a remote device. For example, upon detecting a flood condition via the first sensor 20, an image sensor may be configured to capture an image of the flood condition and this image can be transmitted to a remote device with water level data. In other embodiments, an infrared sensor may be utilized to detect heat signatures, for example of people and animals.

Figure 6:
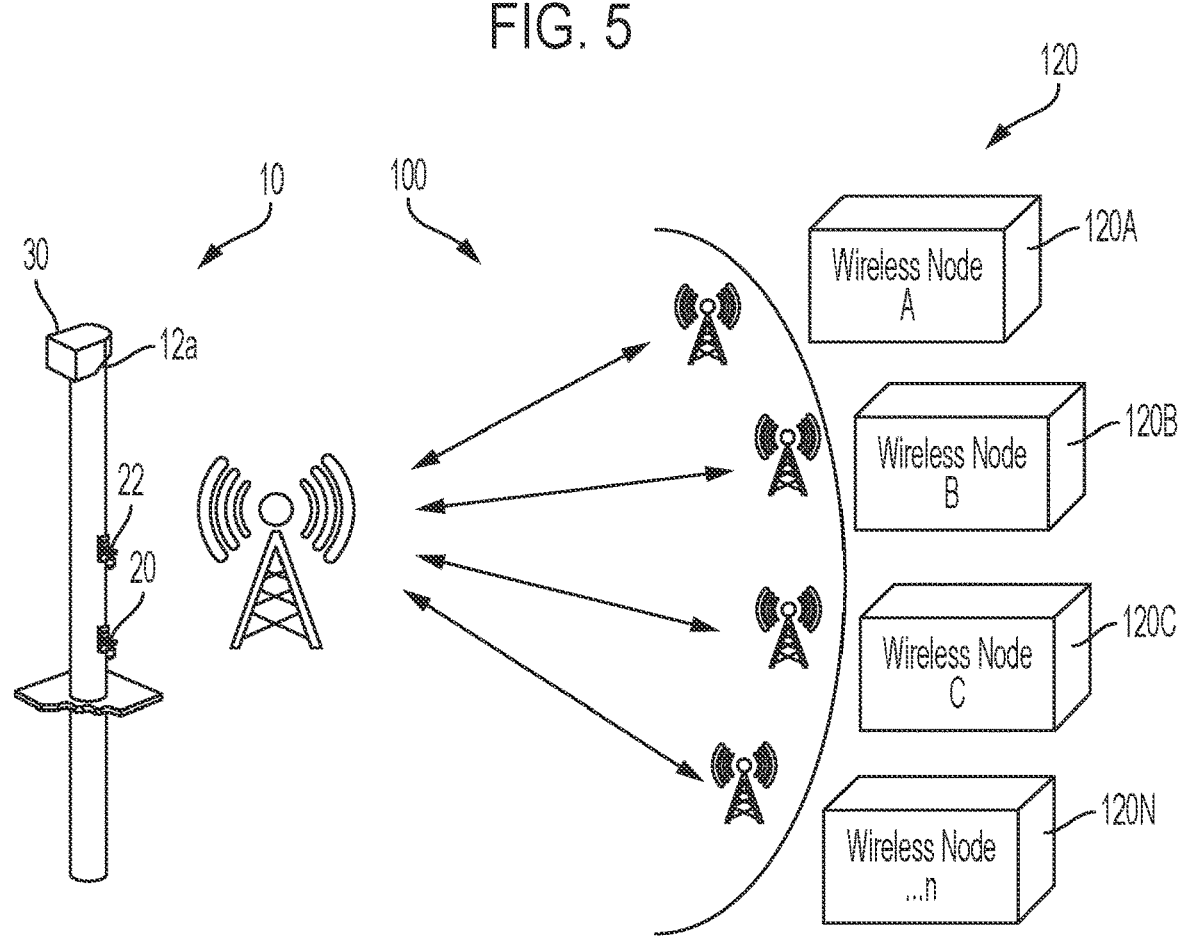
FIG. 6 illustrates a monitoring system according to some embodiments of the present invention.

Referring to FIG. 6, a monitoring system 100 according to some embodiments of the present invention is illustrated. The monitoring system 100 includes a monitoring apparatus 10 and one or more wireless nodes 120 in a vicinity of the at monitoring apparatus 10. Although multiple wireless nodes 120A, 120B, 120C, 120N are illustrated in FIG. 6, the monitoring system 100 can have any number of wireless nodes, including a single wireless node. The illustrated monitoring apparatus 10 includes first and second wireless sensors 20, 22 configured to measure a level of liquid in a vicinity of the monitoring apparatus 10 and to transmit liquid level data to the wireless nodes 120. Each wireless node is configured to receive the liquid level data from the wireless sensors 20, 22 and to transmit the liquid level data to a remote device, such as a smart phone, a computer in an operations center of an electric utility, etc. Exemplary wireless sensors 20, 22 include float sensors, ultrasonic sensors, radar sensors, lidar sensors, etc. Although two wireless sensors 20, 22 are illustrated, a monitoring device may have various numbers of sensors, including a single sensor. Moreover, the monitoring apparatus 10 may have sensors other than liquid level sensors, such as a liquid flow sensor, a moisture sensor, an image sensor, etc.

In some embodiments, the monitoring apparatus 10 may not include liquid level sensors, but may include only other types of sensors. For example, the monitoring apparatus 10 may include a moisture sensor and may be configured to be located within an electronic device enclosure, a cable tray, etc. In some embodiments, one or more weather sensors may be included, such as an anemometer, a temperature sensor, a humidity sensor. Moreover, other sensors such as noise sensors and air quality sensors may be utilized.

In some embodiments, a wireless node 120 may be configured to generate and transmit various alerts or notifications. Such alerts/notifications may trigger not only human intervention but also command various types of equipment in a vicinity of the monitoring apparatus to perform one or more functions. For example, equipment (e.g., pumps, valves, etc.) may be commanded to turn on and/or off. A door may be commanded to close and/or open. Various electrical equipment may be commanded to de-energize and/or re-energize, etc.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A monitoring apparatus, comprising:
    a rigid structure;
    at least one sensor supported by the structure and configured to detect a level of liquid in a vicinity of the structure;
    a housing supported by the structure;
    a transmitter within the housing; and
    a controller within the housing, wherein the controller is in electrical communication with the at least one sensor and the transmitter, wherein the controller is configured to determine a rate of rise of the liquid, and wherein the controller is configured to cause the transmitter to transmit rate of rise data and data received from the at least one sensor to a remote device.

2. The monitoring apparatus of claim 1, wherein the rigid structure is configured to be mounted on or in ground.

3. The monitoring apparatus of claim 2, wherein the structure comprises a pipe or post.

4. The monitoring apparatus of claim 1, wherein the rigid structure is configured to be mounted to another structure.

5. The monitoring apparatus of claim 1, wherein the at least one sensor comprises a first sensor and a second sensor in vertically spaced apart relationship.

6. The monitoring apparatus of claim 5, wherein the first sensor is supported by the structure so as to be located approximately six inches (6") above ground, and wherein the second liquid level sensor is supported by the structure so as to be located approximately eighteen inches (18") above the ground.

7. The monitoring apparatus of claim 1, wherein the at least one sensor comprises a float sensor, an ultrasonic sensor, a radar sensor, a lidar sensor, or a moisture sensor.

8. The monitoring apparatus of claim 1, further comprising a power source configured to supply power to the at least one sensor, the controller, and the transmitter.

9. The monitoring apparatus of claim 8, wherein the power source comprises a battery.

10. The monitoring apparatus of claim 8, wherein the power source comprises:
    a solar power source; and
    a rechargeable battery for storing excess solar energy.

11. The monitoring apparatus of claim 8, wherein the power source comprises an energy harvesting circuit comprising graphene.

12. The monitoring apparatus of claim 1, wherein the at least one sensor, the controller, and the transmitter are configured to receive electrical power from an external AC or DC power source.

13. The monitoring apparatus of claim 1, further comprising an image sensor configured to capture image data of a vicinity of the structure, wherein the controller is in electrical communication with the image sensor and is configured to cause the transmitter to transmit image data received from the image sensor to the remote device.

14. The monitoring apparatus of claim 1, further comprising at least one additional sensor supported by the structure, wherein the at least one additional sensor comprises one or more of the following: a liquid flow sensor, a moisture sensor, an anemometer, a temperature sensor, a humidity sensor, a noise sensor, an air quality sensor.

15. The monitoring apparatus of claim 1, wherein the controller is configured to cause the transmitter to transmit a command to equipment in a vicinity of the monitoring apparatus to perform a function.

16. A monitoring apparatus, comprising:
   a rigid structure configured to be mounted on or in ground;
   a first sensor and a second sensor supported by the structure in vertically spaced apart relationship, wherein the first and second sensors are configured to detect a level of liquid in a vicinity of the structure;
   a housing supported by the structure;
   a transmitter within the housing;
   a controller within the housing, wherein the controller is in electrical communication with the first and second sensors and the transmitter, wherein the controller is configured to determine a rate of rise of the liquid, and wherein the controller is configured to cause the transmitter to transmit rate of rise data and data received from the first and second sensors to a remote device; and
   a power source configured to supply power to the first and second sensors, the controller, and the transmitter.

17. The monitoring apparatus of claim 16, wherein the power source comprises a battery.

18. The monitoring apparatus of claim 16, wherein the power source comprises:
   a solar power source; and
   a rechargeable battery for storing excess solar energy.

19. The monitoring apparatus of claim 16, further comprising at least one additional sensor supported by the structure, wherein the at least one additional sensor comprises one or more of the following: a liquid flow sensor, a moisture sensor, an anemometer, a temperature sensor, a humidity sensor, a noise sensor, an air quality sensor.

20. The monitoring apparatus of claim 16, wherein the controller is configured to cause the transmitter to transmit a command to equipment in a vicinity of the monitoring apparatus to perform a function.

21. A monitoring system, comprising:
   a monitoring apparatus, comprising at least one wireless sensor configured to detect a level of liquid in a vicinity of the monitoring apparatus and a rate of rise of the liquid, and transmit liquid level data and rate of rise data, wherein the at least one wireless sensor comprises a float sensor, an ultrasonic sensor, a radar sensor, a lidar sensor, or a moisture sensor; and
   at least one wireless node in a vicinity of the at least one wireless sensor, the at least one wireless node configured to receive the data from the at least one wireless sensor and to transmit the data to a remote device.

22. The monitoring system of claim 21, wherein the at least one wireless node is configured to transmit a command to equipment in a vicinity of the monitoring apparatus to perform a function.

* * * * *